May 25, 1937. R. S. QUICK 2,081,860
PUMPING SYSTEM
Filed Nov. 15, 1933 3 Sheets-Sheet 1
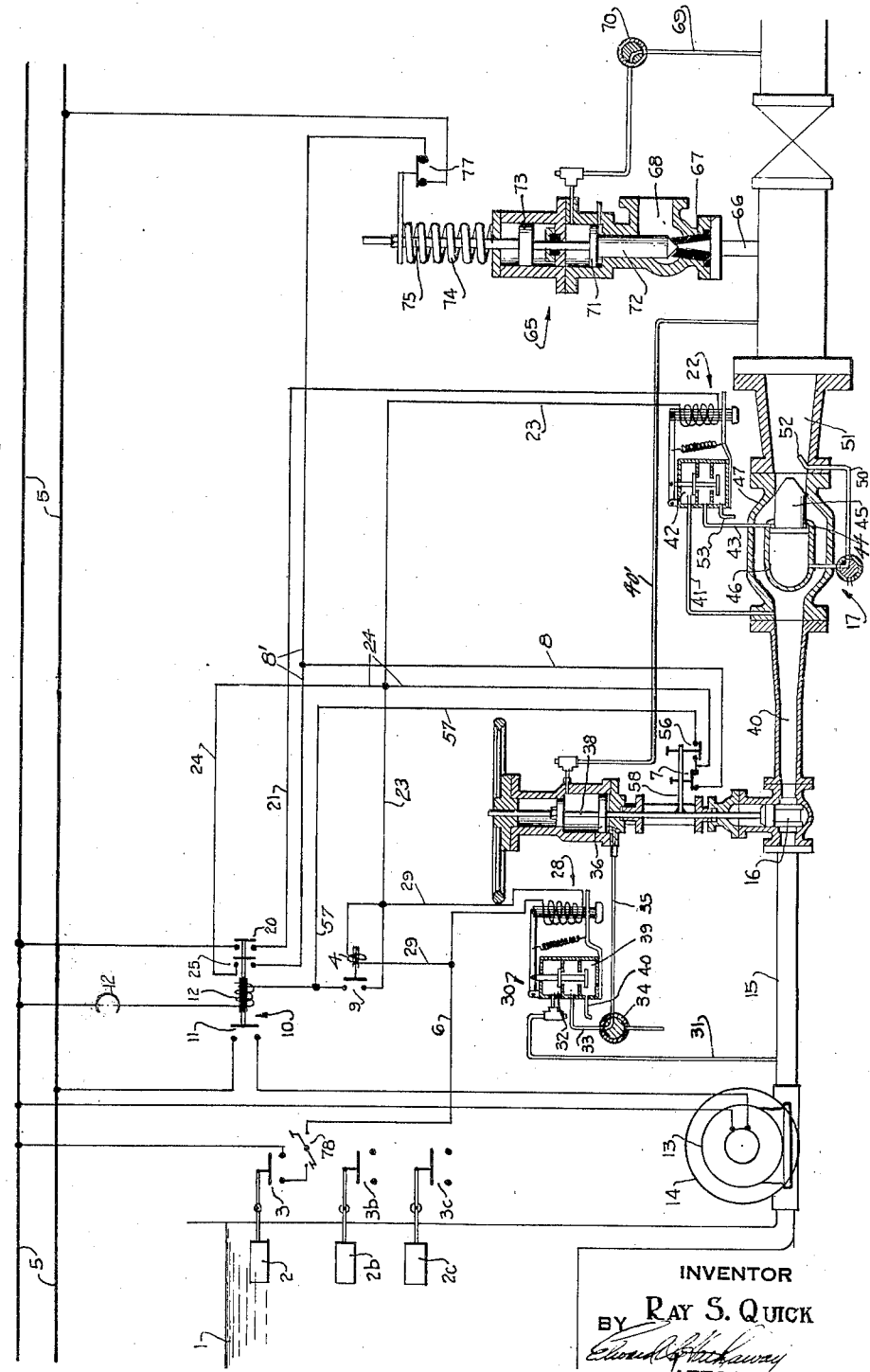
INVENTOR
Ray S. Quick
BY
ATTORNEY May 25, 1937.                R. S. QUICK                2,081,860
                            PUMPING SYSTEM
                        Filed Nov. 15, 1933            3 Sheets-Sheet 2

INVENTOR
BY Ray S. Quick
ATTORNEY

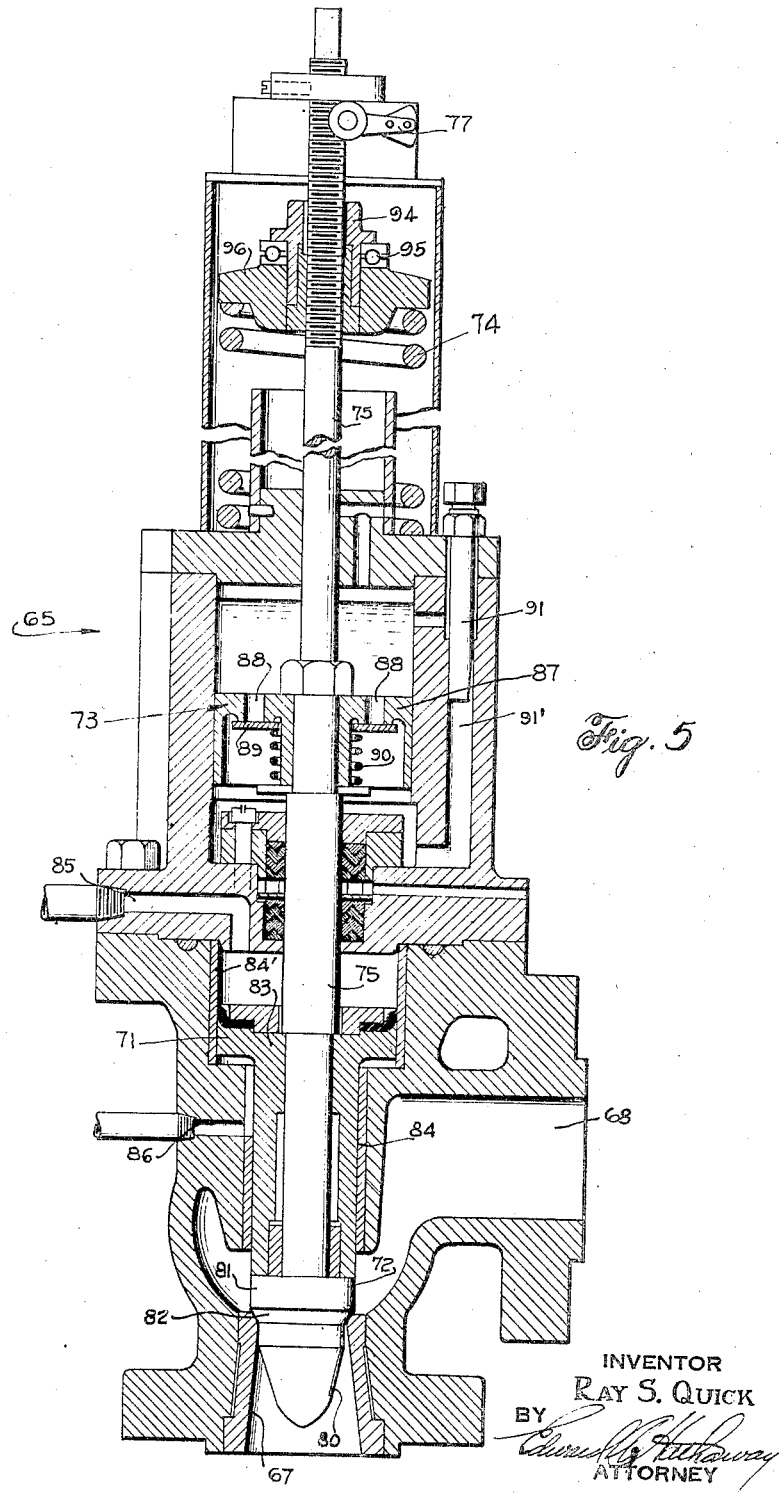

Patented May 25, 1937

2,081,860

UNITED STATES PATENT OFFICE 2,081,860

PUMPING SYSTEM

Ray S. Quick, Burlingame, Calif., assignor to The Pelton Water Wheel Company, a corporation of California Application November 15, 1933, Serial No. 698,078

13 Claims. (Cl. 137—78)

This invention relates generally to pumping systems and more particularly to an improved method and apparatus whereby the pump or pumps may be shut down during normal operation without producing serious pressure disturbances in the pipe line and whereby during emergency shutdown the flow and pressure conditions in the pipe line are controlled by cooperating check and surge suppressor valves.

It is highly desirable in pumping systems to maintain as far as possible highly stable flow and pressure conditions in the pipe line particularly in water distributing systems that usually have a distribution network of several miles of piping. Any irregularities in the flow or pressure conditions of such a system are liable to produce very annoying if not serious consequences resulting from pressure surges and water hammer. Reversal of flow through pumps following prime mover power failure is highly objectionable as it endangers the pump impeller and related parts from debris, often reaches a speed greater than normal which may harm the prime mover, and wastes water already pumped, it being understood that while electric driving motors are herein specifically shown, yet my invention is equally adapted to prime movers of other types such as steam turbines, internal combustion engines, etc. My invention is of course applicable to any pumping system where the elimination of such conditions is desirable.

My improved system includes any suitable source from which fluid is pumped, such as a reservoir, sump or other means of storing water, an electrically driven pump, gate valve, a check valve, and a surge suppressor all arranged in the order named in a pipe line leading from the reservoir. In another aspect of the invention I employ a plurality of pumps and gates connected to a common pipe in which a single check valve serves all of the pumps.

It is one object of my invention to so automatically coordinate all of the elements of my system that during normal shutdown of the pumping system the check valve will close in substantially still water thereby avoiding pressure surges. In one specific aspect of the invention the foregoing and other objects are accomplished by providing automatic means whereby upon shutting down the pumping system the gate valve will close with a pump still running and after the valve is substantially closed the pump will automatically stop. A further specific aspect of the invention in this respect is accomplished by effecting closure of the check valve automatically during or after closure of the gate valve and in response to the closing movement thereof.

It is another object of my invention to provide improved means whereby the pump, gate valve and check valve may operate in the reverse sequence to that of the stopping operation thereby causing the pump to start while the gates and check valve are still closed and then after pressure of the pump fluid has reached a given value, the valve mechanism will open without possibility of reverse flow occurring in the pump line. In this respect it is a more specific object to provide improved means whereby the pump is first started, then the gate valve is automatically opened and finally the check valve is opened, the opening operations of these elements being definitely related to the operation of the pump by virtue of improved means whereby the pressure on the upstream side of each of the valve mechanisms is used to actuate the valves, thereby necessitating starting of the pump to build up pressure on the upstream side of the gate valve before it opens and after opening thereof fluid pressure is built up on the upstream side of the check valve to open the same.

Another object of my invention is to provide improved means whereby in the event of failure of the propelling pressure through the pipe line, thus requiring emergency closure of the valve such as by closure of the check valve, means are provided in cooperation with such check valve operation so as to prevent dangerous pressure surges in the pipe line which would normally occur upon sudden closure of the check valve. A further object in this respect is to have a surge suppressor valve so arranged that during normal pumping operation it remains closed but in the event of emergency operation it opens on a down surge in pressure and then is gradually closed by the return surge to reduce or dampen out the same.

Another object of my invention is to provide an improved pumping system employing a plurality of pumping units and gate valves, all of which are adapted to have the functions and characteristics as above set forth. A further object in this respect is to employ a plurality of pumping units and gate valves connected into a common pipe line which is provided with a single check valve adapted to cooperate with any one of the plurality of units. A still further object is to have the various elements so interconnected that the check valve remains open so long as any one pump is operating notwithstanding that other pumps may be normally started or normally stopped in the interim. A still further object is to have the various elements so interconnected that should one or more pumping units have power interruption and shut down, the remaining units will immediately shut down also, thus preventing reversal of the first-mentioned units. A further object is to employ a single surge suppressor so interconnected with any one or more of the units that the suppressor must be closed before a pump can be started.

Other objects and advantages will be more apparent to those skilled in the art from the following description of the accompanying drawings in which:

Fig. 1 is a diagrammatic layout of a pumping system with my improved automatic electrical controls and mechanical elements embodied therein;

Fig. 5 is a vertical section through my improved surge suppressor used in the pumping system;

Figure 3:
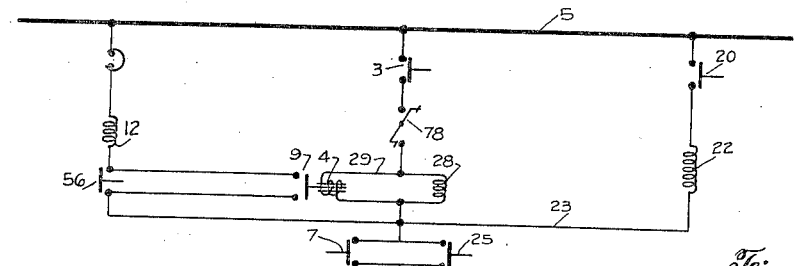
Fig. 3 is a diagram of the wiring system embodied in Fig. 1 but segregated therefrom.

*Starting operation.*—Assuming that the reservoir, standpipe or any other desired source 1, from which water is to be pumped, is below a predetermined level, then the entire system is unable to be operated, and the gate and check valves are closed. The operator closes switch 78 so that as the liquid level of said source rises to some predetermined or normal level, a float 2 will cause closure of a switch 3 to establish a parallel circuit through a starting relay 4 and a gate valve solenoid 28. This circuit is supplied from one side of a main line 5, through switch 3, manually closed switch 78, wire 6, parallel wires 29 to solenoids 4 and 28 and thence to wires 23 and 24 to a closed limit switch 7 and wires 8 and 8' to closed limit switch 77 connected to the other side of line 5. Energization of relay 4 causes closure of its contacts 9 to thereupon energize and actuate a suitable starting box 10 which includes as diagrammatically shown a line switch 11 and holding coil 12 in series with which is an overload relay 12'. Closure of starting switch 11 supplies current from the main line 5 to a motor 13 for driving a suitable pump 14. It will of course be understood that any suitable starting mechanism may be employed to effect proper starting of the motor, or other suitable type of prime mover, although such an arrangement is herein only diagrammatically illustrated as the well-known details thereof do not specifically form part of my present invention.

Starting of pump 14 will build up pressure in a pipe line 15 due to any suitable type of gate valve 16 being closed, but the control circuits are so arranged that opening movement of said gate valve and also of a check valve 17 is initiated simultaneously upon closure of pump motor switch 11. This is effected by the provision of auxiliary contacts 20 and 25 operated to close simultaneously with closure of switch 11, thereby supplying current from one side of line 5, across switch 20 and through a wire 21 to a solenoid 22 and thence through wire 23 to wire 24 and across the second set of auxiliary contacts 25 (operated with contacts 20), then through wire 8' to surge suppressor limit switch contacts 77 and to the other side of line 5. Solenoid 22 actuates a suitable pilot or control valve for check valve 17 while gate control solenoid 28, connected in parallel with relay solenoid 4, is simultaneously energized therewith.

First considering the opening of gate valve 16, solenoid 28 when energized will raise the stem of a three-way valve generally indicated at 30 thereby allowing fluid pressure from the pump, which has been simultaneously started, to be admitted from pipe line 15 through pipe 31 and thence downwardly through an open valve opening 32 (which has been opened by energization of solenoid 28), and out through pipe 33 of a manually operable three-way cock 34 and thence through pipe 35 to the under side of a servo-motor piston 36 for raising said piston and the movable gate valve element connected thereto through a usual stem 38. Prior to opening of the gate valve in the manner just described, it is held in closed position by connecting the under side of piston 36 to a drain through pipes 35 and 33 and thence downwardly through an open valve opening 39 to a drain 40. Drain opening 39 is in such an open position when solenoid 28 is deenergized during which time valve opening 32 is closed. At the same time main line pressure leading through pipe 40' to the differential area of the operating piston 36 acts to move the valve to closed position. On the other hand, opening of valve 16 occurs when equal pressures act on the two sides of the piston, the net closing area being less than the net opening area. This arrangement permits using a three-way pilot 30 on the large piston chamber only, although when the valve opens fluid must be forced back through pipe 40'. As a result of this arrangement the operation is foolproof in that pump discharge pressure must be supplied to the opening chamber through pilot valve 30 and it is not possible to operate the valve improperly by false manipulation of the control such as might be the case with a standard four-way control taking its supply from the discharge line.

After gate valve 16 is opened sufficiently, fluid pressure will build up on the downstream side thereof as in pipe 40. Fluid pressure is thereupon transmitted through a pipe 41, a three-way valve 42 and a pipe 43 to an annular chamber 44 of check valve 17 which preferably is broadly of the well-known Johnson valve type such as shown in Johnson Patent No. 1,321,750, although any other suitable type of controllable check valve may be employed. This specific valve has a plunger 45 telescopically arranged within an internal stationary cylindrical casing 46 which is held in spaced relation to an outer valve casing 47 to provide an annular fluidway therebetween. Movement of plunger 45 in a left hand direction within internal casing 46 will cause water therein to be displaced through a pipe 50 and discharged into pipe line 51 through a suitable Pitot tube 52 projecting in the normal direction of flow. Fluid from pump 14 may now normally flow through the gate valve, check valve and pipe 51. Check valve 17 prior to its opening in the manner just described is held in closed position due to valve 42 being in the position shown which is permitted by virtue of solenoid 22 being deenergized. During such deenergization, annular chamber 44 is drained through drain pipe 53 while fluid pressure is admitted from the downstream pipe 51, thence through Pitot tube 52 and pipe 50 to the internal casing 46 to move plunger 45 in a right hand direction to close the same.

Figure 2:
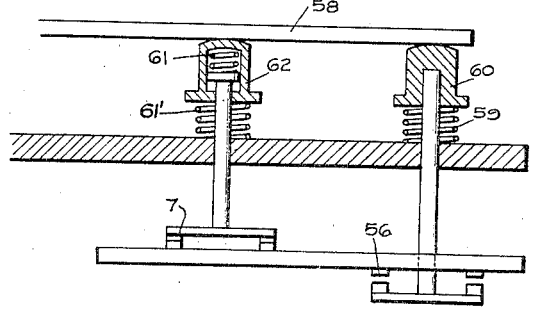
Fig. 2 is an enlarged fragmentary detail showing the construction of the limit switches actuated by the gate valve.

*Shutting down operation.*—With the system in normal operation as above described and if for any reason the level at source 1 should fall below a predetermined point, float 2 will drop and open switch 3 thereby breaking the circuit for relay solenoid 4 and solenoid 28 of the gate valve. However, opening of float switch 3 as just mentioned will not open motor switch 11 because of holding switch 56 having been closed during initial opening of gate valve 16. This switch closes a holding circuit across solenoid 12 as by the line connection through switch 12', wire 57, switch 56, wire 24, contacts 25, wire 8' and contacts 77 to the other side of the line, thereby maintaining starting switch 11 in closed position. When switch 56 is closed, switch 7 is opened as the two switch bars are mechanically operated in any suitable manner such as by an arm 58 secured to the valve stem 38. In order that motor switch 11 will be opened only after gate 16 is practically in its fully closed position, the contact bars for switches 56 and 7 may be yieldably supported in any desired manner as diagrammatically indicated in Fig. 2, wherein a spring 59 will normally urge contact bar of switch 56 upwardly until the switch is closed. Conversely a spring 61 urges contact bar of switch 7 downwardly until its contacts are closed. From this arrangement it is seen that as valve 16 moves upwardly to its open position, switch 7 will remain closed until switch 56 is closed, continued upward movement of valve 16 thereafter causing switch 7 to open by virtue of a spring 61'. Thus switch 7 is opened after switch 56 is closed, the reverse sequence being obtained upon closing movement of valve 16, to wit, switch 56 opens only after switch 7 is closed. Switch 56 preferably opens only after valve 16 has moved to substantially its full closed position.

Now with float switch 3 open, it is seen that solenoid 28 will be deenergized thereby to allow valve stem 30 to move downwardly to drain the under side of gate valve piston 36 as through pipe 35, valve 34, pipe 33, valve opening 39 and drain pipe 40. Closure of the gate valve will gradually stop the flow through the pipe, pressure surges or reverse flow being prevented due to the continued operation of pump 14 during said valve closure. As gate valve 16 closes, switch 7 is also closed to permit relay solenoid 4 to be energized upon any subsequent closure of float switch 3. As full closure is reached, the final movement of the valve will open switch 56 to break the holding circuit for starting switch 11 thereby opening the switch and stopping operation of the pump.

Auxiliary switches 20 and 25 will open simultaneously with 11, switch 20 breaking the circuit to line check solenoid 22, causing chamber 44 of line check 17 to be drained through pipe 43 and valve 42. Fluid pressure is then supplied to the large internal chamber 46 from the pipe line through pipe 50 to effect closure of plunger 45.

The opening of switch 25 which is in parallel with switch 7 on gate valve 16 will deenergize the control circuits and effect closure of the gate valve 16 should the starting switch 11 drop out while the gate valve is open, this feature being very important when two or more pumps are operating and power failure occurs to one or more, making it necessary to shut down the remaining pumps and close the valves without permitting reverse rotation.

From the foregoing it is seen that under normal conditions check valve 17 is closed in substantially still water which is most desirable. Also that the relation between the closing movements of the check and gate valves 17 and 16 may be adjusted by having collars 60 and 62 adjustably mounted on their stems thereby delaying closure of switch 7, if so desired, until just before switch 56 opens which preferably is when gate 16 is closed or substantially so. In this manner it is possible to close check valve 17 in still water as above mentioned with the result that no surge takes place in the line.

*Emergency shutdown.*—In the event of failure of the pumping operation such as would occur upon power failure, the pipe line pressure first drops materially below normal. Failure of the power will deenergize solenoid 22 and drain annular chamber 44 to the atmosphere. Pipe line pressure will be transmitted through pipe 50 to the internal chamber of plunger 45 to move the same to closed position. Also in the event of a pipe line break or in case the check valve is sluggish in its movement or if for any reason the valve should not close immediately after power failure, then the flow in the line would have time to reverse but this reversal of flow would merely accentuate the closing force on the valve by virtue of the reverse flow entering Pitot tube 52 to build up an appreciable pressure in the internal casing 46 thereby to close the plunger.

Whether the check valve closes with or without reversal of flow, nevertheless as the check valve closes, the pipe line pressure will build up very materially due to the return surge which follows the initial drop in pressure, it being understood that the initial pressure drop is not necessarily accompanied by a reversal of flow. On the contrary, the primary cause of such drop in pressure is the continued flow of the water or the tendency of continued flow in the original direction. After the low point of the pressure drop is reached then a return surge occurs but to prevent disturbing water hammer or excessive pressure rise on account of this return surge particularly in view of the closure of the check valve, the surge suppressor 65 is arranged to open automatically during said initial drop in pipe line pressure, thereby to allow discharge of pipe line fluid on the return surge through passage 66, past valve 67 to the atmospheric outlet 68. With the suppressor valve already open prior to the return surge, it is seen that when the return surge does occur a substantially free discharge outlet is already provided. The free discharge is subsequently gradually closed off thus to prevent a large pressure rise.

The connections for the surge suppressor whereby it opens during the initial drop in pipe line pressure comprises a pipe 69 connecting the pipe line to a three-way cock 70 which in turn is connected to a servo-motor cylinder on the top side of a piston 71. The under side of this piston is vented to atmosphere. Piston 71 is connected to valve plunger 72 and also to any suitable type of liquid dashpot generally indicated at 73 which retards only the closing movement of the suppressor valve but allows free opening. The piston, plunger and dashpot are normally urged or biased upwardly by a spring 74 surrounding a stem 75 which extends upwardly from the dashpot 73. Spring 74 is adjusted so that substantially normal pressure in pipe line 51 will act on the top of piston 71 to move plunger 72 to its closed position against the upward force of spring 74. Hence when the pipe line pressure drops substantially below normal on account of the pump stopping, then pressure on the top side of piston 71 will likewise drop to allow spring 74 to move plunger 72 and open valve 67. However, as the pressure of the reverse flow in pipe line 51 approaches normal, then this pressure will act on the top side of piston 71 and move plunger 72 toward closing position, thereby to gradually close off the flow through passages 66 and 68 and consequently suppress or prevent any surge.

From the foregoing disclosure it is seen that a definite mode of cooperation exists between the suppressor valve and check valve in that closure of the check valve permits the return surge to definitely close the surge suppressor.

To insure that the pump will not operate when the surge suppressor is open, switch 77 is required to be closed which occurs only when the suppressor is in closed position, closure of this switch establishing a circuit from the main line leading to the relay 4 and starting box 10.

If for any reason it is desired to close the gate and check valves and close down the pump, it is only necessary to open manually operable switch 78. In Fig. 3 there is provided a wiring diagram segregated from the mechanical elements of the system shown in Fig. 1 and corresponding parts are given the same reference numbers.

Figure 4:
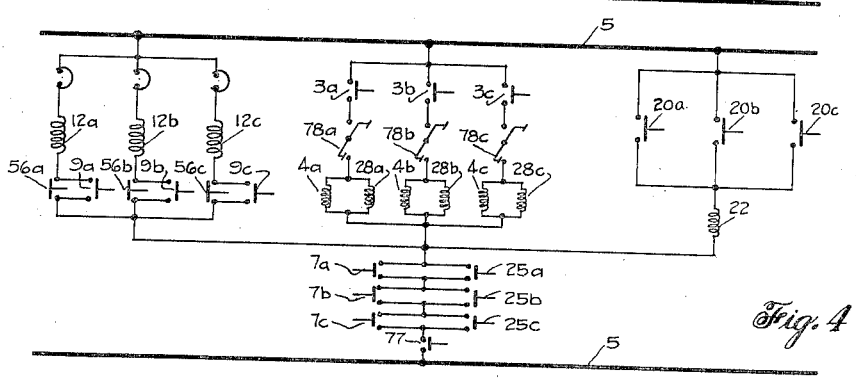
Fig. 4 is a wiring diagram similar to that of Fig. 3 but showing diagrammatically how my improved system is applied to a plurality of units, specifically three, although in accordance with the principles disclosed any number of units may be interconnected by the parallel circuits of this Fig. 4 form.
Figure 6:
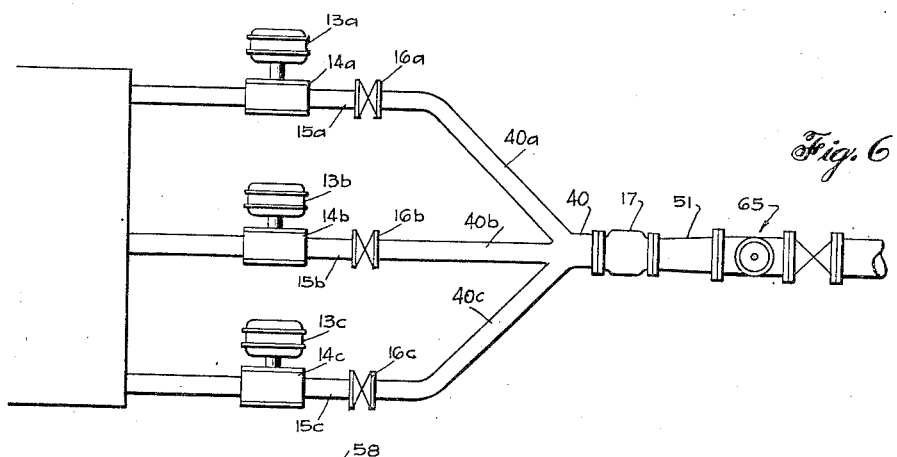
Fig. 6 is a mechanical layout of the plural pumping system to which the wiring diagram of Fig. 4 is applied.

In Fig. 4 there is also shown a segregated wiring diagram for a three-pump system adapted to perform the various functions as outlined with the single pump system heretofore described. As shown in Fig. 6, pumps 14a, 14b and 14c are disposed respectively in branch pipes commonly connected to a pipe 40 which from there on corresponds with the system heretofore described including a single check valve. Each branch has a gate valve 16a, 16b and 16c. The control mechanisms and circuits for each pump and gate valve are the same as in the single pump system heretofore described. The single check valve is connected with the controls of the three pump system so as not to close so long as any one pump is operating. To effect this mode of operation, it is seen in the diagram of Fig. 4 that the control circuits for each pump and gate valve unit are connected in parallel with the circuit for the single pump unit shown in Fig. 1.

The pump units in Fig. 4 are adapted to be successively started and stopped by the provision of suitable means for selectively closing the circuits for each pump motor in accordance with certain predetermined conditions of operation such, for example, as the quantity of fluid it is desired to pump from the source. For instance, if the reservoir is completely full, it is then desirable to operate all pumps, whereas if the level in the reservoir falls, or if other conditions dictate a smaller quantity of pumped fluid, then certain of the pumps are cut out. To effect this, various means may be employed and one such form is diagrammatically shown in Fig. 1, wherein different floats 2, 2b and 2c are disposed in the reservoir at different levels to successively close their float switches 3, 3b and 3c. If it is desired to operate the pumps in some selected order, it is only necessary to provide a suitable selector switch for the group of contacts 3, 3b and 3c, whereby, for example, the pumping system 14a may be operated from switch 3c and pump 14c from switch 3. Likewise any other combination may be employed between all three of the switches and pumps. On the other hand, if it is desired, a single float may be employed together with a suitable selector switch and time delay relay whereby when the float is closed all three pumps may start operating and then be selectively cut off, or one pump started and the others successively added at given intervals. In any event it is seen that the check valve solenoid 22 is connected to the parallel circuits for each of the pumps whereby as long as any one of these parallel circuits is functioning or closed then the check valve will remain open. Also by operating or controlling any one of these parallel circuits as in the manner of the single pump description, the gate valve in that circuit may be closed while its pump is still running after which the pump automatically stops when the gate reaches its closed position. On the other hand, if for any reason one or more pumps should fail, all will shut down and the check valve will close automatically and the surge suppressor will automatically open and reclose to control pressure surges.

*Surge suppressor valve.*—As previously mentioned the surge suppressor used in my improved pumping system is of the elbow discharge type and includes as shown more specifically in Fig. 5 preferably a removable member to form preferably the tapered passageway 67 communicating with outlet 68 while the plunger 72 has preferably a conical portion 80 and cylindrical portion 81 connected with a tapered valve seat 82. This plunger is secured to the end of valve stem 75 while a combined plunger and guide sleeve 83 is also secured on said stem between a shoulder thereon and plug 72. This sleeve, stem and plug are adapted to be guided in any suitable bearing 84 projecting into the elbow water passage while a suitable packing is provided on member 83 to form the servo-motor piston generally referred to at 71. Piston 71 operates in a cylinder 84' to the upper end of which upstream pressure is supplied through passage 85. The lower end of cylinder 84' is vented along the bearing 84 and out through drain 86. The dashpot 73 includes any suitable piston 87 having ports 88 normally closed by an annular valve 89 yieldably held in closed position by a spring 90. An adjustable bypass valve 91 allows restricted flow of liquid through passage 91' as from the lower end of dashpot cylinder 92 to the upper end thereof on the down closing stroke of the suppressor valve and dashpot piston, it being understood that the suppressor valve and dashpot may easily move upwardly by virtue of flow of liquid from the upper end of the dashpot cylinder past the valve 89 to the lower end of the cylinder. This difference in rate of closing and opening is desirable as the retarded down movement of the plunger effects gradual closure of the suppressor valve, thereby preventing an excessive pressure rise in the pipe line while the more rapid opening is effective in placing the valve in immediate operation when the surge producing conditions arise.

In operation as hereinbefore described the suppressor valve opens during the down drop in pressure in the pipe line thereby reducing the pressure on the top side of piston 71, where-upon spring 74 moves the valve to open position. However, upon the return surge the upstream pressure again builds up on top of piston 71 as through pipe 69 and port 85, Figs. 1 and 5, to move the valve toward closing position but at a relatively gradual rate on account of the action of dashpot 73. Hence it is seen that I have provided a simple surge suppressor valve that is opened by spring pressure which may be suitably adjusted by a nut 94 threaded on stem 75. A ball bearing 95 is interposed between the nut and a suitable spring collar 96.

*Summary of certain sequence of events.*—To briefly repeat, certain functions performed by my improved system comprise starting of the pump only if all hydraulic valves are closed whereafter the gate and check valves open automatically in response to pump operation. Specifically this sequence of events is performed by starting the pump which builds up pressure in the pipe line between the pump and gate valve to supply the necessary fluid pressure for operating the gate valve servo-motor thereby opening the gate valve. Opening of the gate valve allows fluid pressure to be built up between the gate valve and check valve to thereupon supply fluid pressure to the check valve to open the same. Thus the gate valve is first opened, followed by opening of the check valve, these opening operations being effected only by maintaining the pump in operation and thus preventing reverse flow through the pipe line into the pump as might otherwise occur in case the gate or check valves were opened prior to maintaining or building up pump pressure. Normal shutdown is effected by opening of the float switch but notwithstanding the opening of this switch the pump continues to operate but at the same time the gate valve closes. The pump continues to operate until the gate valve is fully closed at which time the gate valve operates limit switch 56 to break the holding circuit for the motor starting switch 11, allowing the auxiliary switch 20 to cause closure of the line check in what might be termed still water without any reversal of flow in the pipe line. If two or more pumps are operating and one is shut down, then the gate valve for the shutting down pump will close and stop its corresponding motor and pump but the check valve remains open.

If for any reason the power supply to the motor or motors fails, the solenoids 22 and 28 are deenergized to effect valve closure. Should reverse flow take place in the pipe line, then this flow passes through Pitot tube 52 and pipe 50 to assist in moving the check valve 17 to its closed position. This reverse flow is accompanied by a drop in pipe line pressure followed by a return pressure rise. The drop in pressure relieves the holding pressure on the surge suppressor 65 thereby to permit its spring 74 to open the suppressor valve in advance of the return surge whereby a substantially free outlet is provided when the return surge does occur. However, as the return pressure approaches normal, this very pressure is utilized to move the suppressor valve toward closed position and thereby gradually close off the discharge to prevent excessive pressure rise, the suppressor valve finally completely closing. Also the system may not be started unless the suppressor valve is closed, this being on account of the interconnection of the limit switch 77 with the control circuits for the pump motor. It is also seen that the surge suppressor and check valve are so coordinated with the pump operation and with each other that failure of the motor current produces a definite dependent operative relation and sequence of functions and events between these elements and the system as a whole, thereby creating a highly efficient pumping system adapted to effectively control dangerous surge conditions without impairing the desired normal operation of the system such as having the gates and check valve sequentially or simultaneously closed while the pump is still running. This mode of operation prevents surges during normal closure but if for any reason dangerous surges should occur during such operation, then the surge suppressor will open on the pressure drop so as to be open and ready to provide a free discharge for the return surge, this return surge gradually causing closing movement of the suppressor.

Hence I have provided a highly flexible system which in actual practice has been found to be very efficient and successful, although it will of course be understood by those skilled in the art that various changes may be made in the details of construction and arrangement of parts without departing from the spirit of the invention as set forth in the appended claims.

I claim:

1. A pumping system comprising, in combination, a hydraulic pipe line having a hydraulic pump and a gate valve on the discharge side thereof, power operated means for moving said gate valve to its closed position during flow of fluid through the line, means for controlling the application of power to said power operated means to effect said closure, and means for stopping said pump automatically only after said gate valve is in its substantially closed position.

2. A pumping system comprising, in combination, a pipe line having a pump, a check valve and a gate valve each adapted to close the pipe line; said gate valve being located between said pump and check valve; means for moving said gate valve to its closed position during flow of fluid through the line; means for controlling said pump automatically in accordance with the gate valve operation, and means adapted upon closure of said gate valve to automatically effect closure of said check valve whereby said check valve closes in substantially still water.

3. A pumping system comprising, in combination, a pipe line having a pump, a check valve and a gate valve each adapted to close the pipe line; said gate valve being located between said check valve and pump; means for moving said gate valve to its closed position during flow of fluid through the line; and means responsive to pump operation for automatically sequentially operating said gate valve and check valve whereby said check valve is adapted to close in substantially still water after said gate valve is closed.

4. A pumping system comprising, in combination, a pipe line having a pump, a check valve and a gate valve each adapted to close the pipe line; said gate valve being located between said check valve and pump and both of said valves being closed when the pump is not running; means responsive to the operation of said pump for effecting opening movement of said gate valve, and solenoid controlled means adapted to permit said check valve to open after said gate valve opens.

5. A pumping system comprising, in combination, a pipe line having a pump, a check valve and a gate valve each adapted to close the pipe line; said gate valve being located between said check valve and pump and both of said valves being closed when the pump is not running; and means responsive to the operation of said pump for first effecting opening movement of said gate valve followed by opening of said check valve; said means having fluid pressure chambers and pistons therein for moving each valve to its open position by fluid pressure supplied by the operation of said pump.

6. A pumping system comprising, in combination, a motor driven pump, a pipe line connected thereto, a fluid operated check valve in said line, a fluid operated gate valve also in said line and located between said check valve and pump, and electrical means controlled by the circuit of said pump motor for controlling the supply of operating fluid to each of said valves.

7. A pumping system comprising, in combination, a motor driven pump, a pipe line connected thereto, a fluid operated check valve in said line, a fluid operated gate valve also in said line and located between said check valve and pump, and electrical means controlled by the circuit of said pump motor for controlling the supply of operating fluid to each of said valves, said means having provision whereby movement of said gate valve controls the electrical connection for said check valve.

8. A pumping system comprising, in combination, a pipe line having a pump, gate valve, check valve and surge suppressor valve; said gate valve and check valve, each being adapted to close the pipe line means whereby during normal pumping operation said gate and check valves are open and the surge suppressor is closed, and means whereby during shutting down of said system the gate valve is first substantially closed followed by closing of said check valve in substantially still water thereby permitting the surge suppressor to remain closed.

9. A pumping system comprising, in combination, a pipe line having a pump, gate valve, check valve and surge suppressor valve; said gate valve and check valve each being adapted to sequentially close the pipe line automatically in response to failure of the pumping system, means whereby during normal pumping operation said suppressor valve is closed and said other valves are open whereby upon failure of the pumping operation the pipe line pressure drops below normal followed by a return surge; means whereby said suppressor valve opens during said drop in pressure to provide a free outlet for the pipe line fluid when the return surge occurs thereby to dampen the same; and means for closing said check valve to control fluid flow in the pipe line and effect closing movement of said suppressor valve against the discharge of pipe line fluid.

10. A pumping system comprising, in combination, a pipe line having a pump, gate valve, check valve and surge suppressor valve; means whereby during normal pumping operation said suppressor valve is closed and said other valves are open, failure of the pumping operation causing a down surge to occur to produce a pipe line pressure below normal followed by a return surge; means whereby said suppressor valve opens during said drop in pressure to provide a free outlet for the pipe line fluid when the return surge occurs thereby to dampen the same; means for closing said check valve to control fluid flow in the pipe line and effect closing movement of said suppressor valve against the discharge of pipe line fluid; and means whereby said surge suppressor must be in closed position before said pump may thereafter operate.

11. A pumping system comprising, in combination, a plurality of pumps and gate valves connected to a common pipe line, a check valve in said common line, means for operating any one or more of said pumps with their respective gate valves open and with said check valve open, means whereby upon stopping of any pump its gate valve is automatically closed, means whereby said check valve remains open so long as any one of said pumps is normally operating, and means whereby said check valve closes automatically only when all pumps are stopped.

12. A pumping system comprising, in combination, a plurality of motor driven pumps connected to branch pipes which in turn are all connected to a common pipe line, valve mechanism associated with said pumps, float operated means adapted to successively initiate operation of said pumps automatically in accordance with predetermined operating conditions, and means whereby said valve means remains open during operation of any one of said pumps but closes upon shutting down of all of said pumps.

13. A pumping system comprising, in combination, a plurality of pumps and gate valves connected to a common pipe line, a check valve and a surge suppressor valve in said common line, means for operating any one or more of said pumps with their respective gate valves open and with said check valve open and said suppressor valve closed, means whereby as long as any one of said pumps is normally operating said check valve remains open, and means whereby upon stopping all of said pumps said check valve closes automatically, and means whereby upon pressure surges in said pipe line said suppressor valve opens upon a drop in pressure to permit a free discharge of fluid upon a return surge and then closes.

RAY S. QUICK.